United States Patent
Quellec

(10) Patent No.: US 12,223,700 B2
(45) Date of Patent: Feb. 11, 2025

(54) AUTOMATIC IMAGE ANALYSIS METHOD FOR AUTOMATICALLY RECOGNIZING AT LEAST ONE RARE CHARACTERISTIC

(71) Applicants: UNIVERSITE DE BREST, Brest (FR); INSERM, Paris (FR)

(72) Inventor: Gwenolé Quellec, Brest (FR)

(73) Assignees: Université Brest Bretagne Occidentale, Brest (FR); Institut National de la Santé et de la Recherche Médicale (INSERM), Paris (FR)

( * ) Notice: Subject to any disclaimer, the term of this patent is extended or adjusted under 35 U.S.C. 154(b) by 399 days.

(21) Appl. No.: 17/610,098

(22) PCT Filed: May 7, 2020

(86) PCT No.: PCT/EP2020/062762
§ 371 (c)(1),
(2) Date: Nov. 9, 2021

(87) PCT Pub. No.: WO2020/229310
PCT Pub. Date: Nov. 19, 2020

(65) Prior Publication Data
US 2022/0237900 A1    Jul. 28, 2022

(30) Foreign Application Priority Data
May 10, 2019 (FR) .................................. 1904877

(51) Int. Cl.
*G06V 10/82*    (2022.01)
*G06N 3/045*    (2023.01)
(Continued)

(52) U.S. Cl.
CPC ............. *G06V 10/82* (2022.01); *G06N 3/045* (2023.01); *G06T 7/74* (2017.01); *G06V 10/761* (2022.01);
(Continued)

(58) Field of Classification Search
CPC ................. G06V 10/82; G06V 10/761; G06V 10/7715; G06N 3/045; G06T 7/74;
(Continued)

(56) References Cited

U.S. PATENT DOCUMENTS 9,158,976 B2 * 10/2015 Datta ...................... G06T 7/251
10,235,601 B1 * 3/2019 Wrenninge ........... G06F 18/214
(Continued)

FOREIGN PATENT DOCUMENTS

WO    2020229310 A1    11/2020

OTHER PUBLICATIONS

Foreign Communication from a Related Counterpart Application, International Search Report dated Jul. 13, 2020, International Application No. PCT/EP2020/062762 filed on May 7, 2020.
(Continued)

*Primary Examiner* — Solomon G Bezuayehu
(74) *Attorney, Agent, or Firm* — von Briesen & Roper, s.c.

(57) ABSTRACT

Disclosed is an automatic image analysis method that can be used to automatically recognise at least one rare characteristic in an image to be analysed. The method comprises a learning phase during which at least one convolutional neural network is trained to recognise characteristics, a parameter space of dimension n, in which n≥2, is constructed from at least one intermediate layer of the network, a presence probability function is determined for each characteristic in the parameter space from a projection of reference images in the parameter space. During a phase of
(Continued)

analysing the image to be analysed, the method comprises a step of recognising the at least one rare characteristic in the image to be analysed on the basis of the presence probability function determined for the at least one rare characteristic.

13 Claims, 8 Drawing Sheets

(51) Int. Cl.
 *G06T 7/73* (2017.01)
 *G06V 10/74* (2022.01)
 *G06V 10/77* (2022.01)

(52) U.S. Cl.
 CPC ............... *G06V 10/7715* (2022.01); *G06T 2207/20081* (2013.01); *G06T 2207/20084* (2013.01)

(58) Field of Classification Search
 CPC ........... G06T 2207/20081; G06T 2207/20084; G06F 18/213; G06F 18/2135; G06F 18/2431
 See application file for complete search history.

(56) References Cited

U.S. PATENT DOCUMENTS

| | | | | |
|---|---|---|---|---|
| 10,453,197 | B1* | 10/2019 | Cholakkal | G06V 10/454 |
| 10,580,530 | B2* | 3/2020 | Rim | G06T 11/00 |
| 10,776,664 | B2* | 9/2020 | Tsishkou | G06F 18/253 |
| 11,429,837 | B2* | 8/2022 | Malhotra | G06N 3/0495 |
| 2004/0095344 | A1* | 5/2004 | Dojyun | G06T 13/40 345/419 |
| 2017/0345268 | A1* | 11/2017 | Cho | G08B 13/19673 |
| 2018/0046759 | A1* | 2/2018 | Barral | G06F 16/58 |
| 2018/0089515 | A1* | 3/2018 | Yang | G06V 20/54 |
| 2018/0137642 | A1* | 5/2018 | Malisiewicz | G06V 20/64 |
| 2019/0164642 | A1* | 5/2019 | Hartung | G06V 10/82 |
| 2019/0223728 | A1* | 7/2019 | Heidari | A61B 5/0088 |
| 2019/0286938 | A1* | 9/2019 | Backhus | G06F 18/214 |
| 2019/0302707 | A1* | 10/2019 | Guo | G05B 23/024 |
| 2019/0370662 | A1* | 12/2019 | Song | G06N 3/088 |
| 2020/0090005 | A1* | 3/2020 | Ghosh | G06V 10/82 |
| 2020/0167634 | A1* | 5/2020 | Jain | G06N 3/08 |
| 2020/0294288 | A1* | 9/2020 | Smith | G06T 7/0012 |
| 2021/0089816 | A1* | 3/2021 | Amon | G06T 7/194 |
| 2021/0171025 | A1* | 6/2021 | Ishikawa | G06N 3/006 |
| 2022/0160208 | A1* | 5/2022 | Liao | A61B 5/202 |

OTHER PUBLICATIONS

Foreign Communication from a Related Counterpart Application, Written Opinion dated Jul. 13, 2020, International Application No. PCT/EP2020/062762 filed on May 7, 2020.

Perronnin Florent, et al.: "Fisher vectors meet Neural Networks: A hybrid classification architecture", 2015 IEEE Conference on Computer Vision and Pattern Recognition (CVPR), IEEE, Jun. 7, 2015, pp. 3743-3752, XP032793825, DOI: 10.1109/CVPR.2015. 7298998.

Quellec Gwenole, et al: "Deep image mining for diabetic retinopathy screening", Medical Image Analysis, Oxford University Press, Oxford, GB, Apr. 28, 2017, XP085107044, ISSN: 1361-8415, DOI: 10.1016/J.MEDIA.2017.04.012.

Yandong Guo, et al: "One-shot Face Recognition by Promoting Underrepresented Classes", arxiv.org, Cornell University Library, 201 OLIN Library Cornell University Ithaca, NY 14853, Jul. 18, 2017, XP081309417.

\* cited by examiner

AUTOMATIC IMAGE ANALYSIS METHOD FOR AUTOMATICALLY RECOGNIZING AT LEAST ONE RARE CHARACTERISTIC

CROSS-REFERENCE TO RELATED APPLICATIONS

The present application is a filing under 35 U.S.C. 371 as the National Stage of International Application No. PCT/EP2020/062762, filed May 7, 2020, entitled "AUTOMATIC IMAGE ANALYSIS METHOD FOR AUTOMATICALLY RECOGNISING AT LEAST ONE RARE CHARACTERISTIC," which claims priority to French Application No. 1904877 filed with the Intellectual Property Office of France on May 10, 2019, both of which are incorporated herein by reference in their entirety for all purposes.

The present document relates to the field of automatic recognition of rare characteristics in images and to an image analysis method. The image analysis method is applicable in numerous technical fields, such as the detection of rare diseases or pathologies on the basis of medical images or the detection of the presence of rare events on the basis of video surveillance images.

The present description more particularly relates to the recognition of characteristics present in a number of images that is so low (for example, less than 10 images) that supervised learning, a fortiori deep learning, is not possible.

The image analysis method will be more particularly described within the scope of the automatic recognition or screening of rare ocular pathologies on the basis of photographs or images of the fundus oculi without having any limitation of this application. In order to perform this screening, it is known for learning techniques (transfer learning, multi-task learning, spontaneous learning) to be used that are associated with convolutional neural networks. The neural networks are then trained to detect the ocular pathologies on the basis of collections of images of the fundus oculi.

These techniques allow numerous pathologies to be detected, in particular diabetic retinopathy, age-related macular degeneration (ARMD) or glaucoma, which are frequent pathologies. However, they are not suitable for detecting rare pathologies due to the low number of images of the fundus oculi characterizing these pathologies.

More generally, the neural networks as they are currently used do not allow rare characteristics to be detected.

This document describes an automatic image analysis method (abbreviated to "analysis method" or "image analysis method") allowing automatic recognition of a rare characteristic in an image, and optionally allowing the pixels corresponding to this rare characteristic to be identified in the analyzed image.

The automatic image analysis method proposes, for recognizing rare characteristics, being based on models that are trained to recognize frequent characteristics.

More specifically, an automatic image analysis method is described, the method comprising a learning phase and an analysis phase, said method comprising:
during said learning phase:
  a step of supervised deep learning of at least one convolutional neural network on the basis of a collection of images associated with annotations for generating at least one trained convolutional neural network, arranged in layers and forming a learning model configured to recognize at least one frequent characteristic in an image to be analyzed, said collection of images comprising images having said at least one frequent characteristic and images having at least one rare characteristic, an annotation indicating whether a rare or frequent characteristic is present in an image of the collection of images;
  a step of constructing a parameter space of dimension n, with n≥2, each parameter originating from at least one intermediate layer of said at least one trained convolutional neural network and each parameter representing a dimension of said parameter space;
  a step of determining a presence probability function in said parameter space for at least one rare characteristic on the basis of a projection, in said parameter space, of said images of the collection of images and annotations relating to said at least one rare characteristic;
during said analysis phase:
  for an image to be analyzed, a step of recognizing said at least one rare characteristic in said image to be analyzed on the basis of the presence probability function determined for said at least one rare characteristic.

According to example embodiments, the method further comprises a step of determining a presence probability function in said parameter space for said at least one frequent characteristic on the basis of a projection, in said parameter space, of said images of the collection of images and annotations relating to said at least one frequent characteristic.

According to example embodiments, the supervised deep learning step of said at least one convolutional neural network is supervised by said presence probability function of said at least one frequent characteristic.

According to example embodiments, the method further comprises, during the analysis phase, a step of recognizing said at least one frequent characteristic in said image to be analyzed on the basis of said learning model or of the presence probability function determined for said at least one frequent characteristic.

According to example embodiments, the method further comprises, during the learning phase, a step of determining a presence probability function in said parameter space for said at least one frequent characteristic and in that the supervised deep learning step of said at least one convolutional neural network is supervised by said presence probability function of said at least one frequent characteristic.

According to example embodiments, the method further comprises, during the learning phase, a step of preprocessing images of the collection of images for improving the learning of said at least one convolutional neural network.

According to example embodiments, during the supervised deep learning step, a plurality of convolutional neural networks is trained separately or jointly, with each of said convolutional neural networks being trained to recognize said at least one frequent characteristic.

According to example embodiments, the convolutional neural networks are trained simultaneously, via a logistic regression, in order to maximize their complementarity.

According to embodiments, during the step of constructing said parameter space on the basis of data originating from at least one intermediate layer of said at least one convolutional neural network, said at least one intermediate layer is selected from among the penultimate layers of said at least one convolutional neural network.

According to example embodiments, the method further comprises a step of determining an absence probability function in said parameter space for said at least one rare characteristic on the basis of a projection, in said parameter space, of said images of the collection of images and annotations relating to said at least one rare characteristic, said at least one intermediate layer being selected based on the maximization, for at least one considered rare characteristic, of the Patrick-Fischer distance between the presence probability function of said at least one considered rare characteristic and the absence probability function of said at least one considered rare characteristic.

According to example embodiments, the parameter space is a reduced parameter space and the step of constructing the reduced parameter space comprises a step of reducing the dimension of an initial parameter space at the output of said at least one intermediate layer of said at least one trained convolutional neural network.

According to example embodiments, the dimension of the parameter space after reduction is equal to 2 or 3.

According to example embodiments, the step of reducing the dimension of the parameter space is based on a principal component analysis algorithm and/or on a t-SNE algorithm.

According to example embodiments, the method further comprises, for at least one rare or frequent characteristic recognized in an image, called current image, a step of determining pixels responsible for recognizing said rare or frequent characteristic in said current image.

According to example embodiments, determining pixels responsible for recognizing said rare or frequent characteristic, in said current image, is obtained by gradient backpropagation through each of the convolutional neural networks involved in the construction of the parameter space.

According to example embodiments, the recognition step comprises:
constructing a second reduced parameter space by reducing the parameter space at the output of said at least one intermediate layer of said at least one trained convolutional neural network;
projecting, in the second parameter space, the image to be analyzed in order to obtain a projected image;
obtaining reference projected images in the second parameter space obtained by projecting reference images of the collection of images; and
estimating a probability that the image to be analyzed contains the rare characteristic, said probability being computed by regression on the basis of presence probabilities of the rare characteristic determined for the reference images for which the reference projected images are the nearest neighbors of the projected image.

According to example embodiments, the second reduced parameter space is constructed by means of a principal component analysis applied to the parameter space at the output of said at least one intermediate layer and the projection of an image in the second reduced parameter space is obtained by applying said at least one trained convolutional network to the considered image in order to obtain an output, then applying a projection function originating from the principal component analysis to this output.

According to example embodiments, the presence probability of a rare characteristic in a reference image is obtained by projecting the reference image in the reduced parameter space constructed for the rare characteristic so as to obtain a reference projected image, then applying the presence probability function defined in the reduced parameter space to the reference projected image.

According to example embodiments, an analysis device configured to implement the steps of the analysis method as claimed in any one of the preceding claims.

Further features and advantages will become more clearly apparent from reading the following detailed description of various embodiments, which are provided by way of a non-limiting example and are illustrated by the accompanying drawings, in which.

Figure 1:
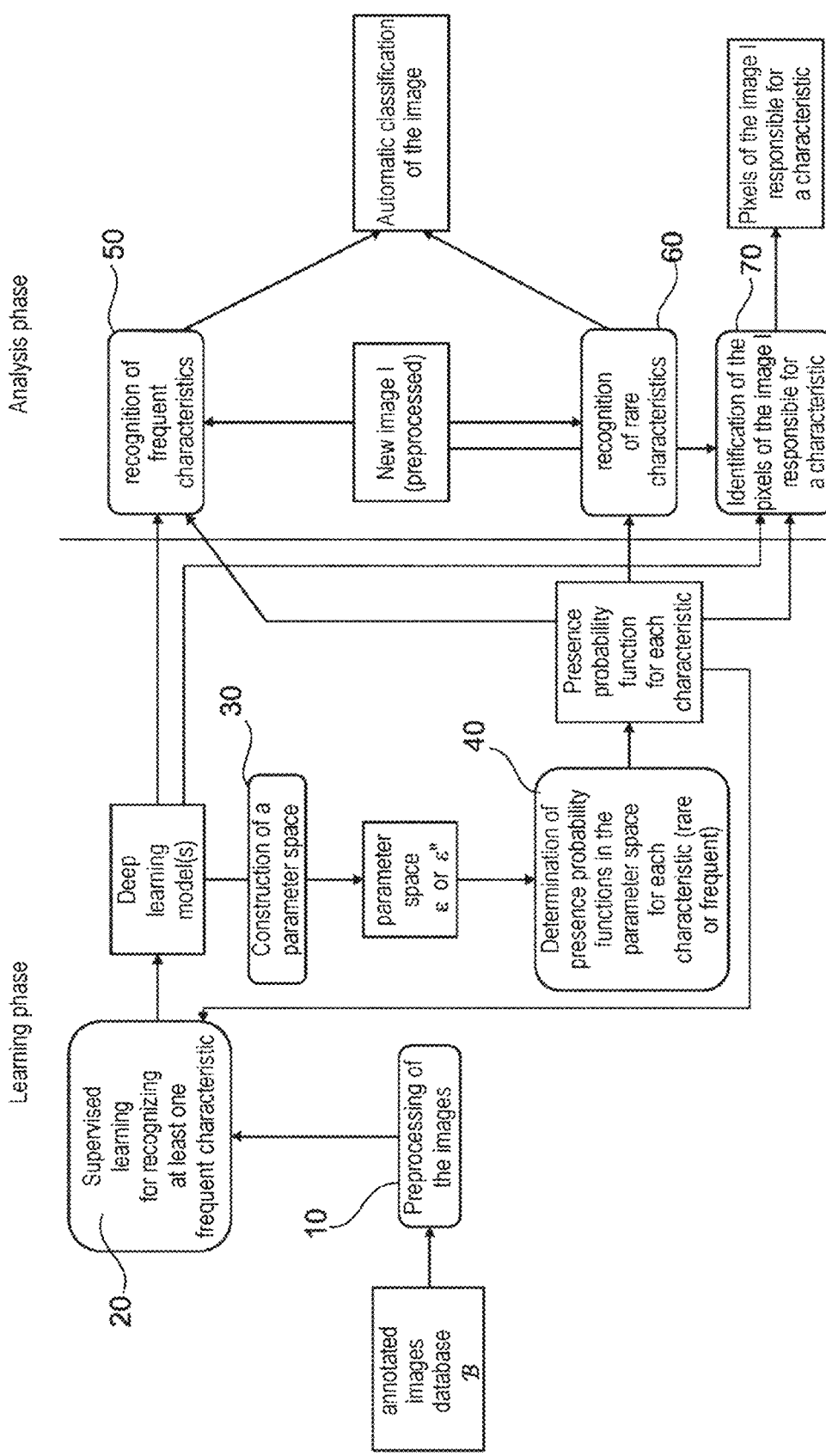
FIG. 1 shows a flow chart of the automatic image analysis method according to a first embodiment.

FIG. 1 illustrates an embodiment of the automatic image analysis method. The automatic image analysis method aims to detect (or recognize) at least one rare characteristic in an image to be analyzed. It also allows at least one frequent characteristic to be recognized.

The automatic image analysis method comprises a learning phase, during which a convolutional neural network is trained to recognize one or more frequent characteristics on the basis of a collection of annotated (or marked) images and during which presence probability functions are defined for each rare or frequent characteristic, and an analysis phase, during which an image is analyzed to determine, on the basis of the trained neural network and of the presence probability functions, whether it comprises rare or frequent characteristics.

A collection of annotated images denotes a database of images, each of which is associated with at least one label (also called annotation herein) indicating whether or not a given characteristic (rare or frequent) is present in the image.

Throughout the remainder of the description, $B$ denotes a collection of images in which the presence or the absence of $N$ characteristics has been indicated by one or more experts for each image $I \in B$. $B$ is, for example, the collection of fundus oculi images supplied by the OPHDIAT telemedical network for screening diabetic retinopathy. In this collection, the number $N$ is equal to 41. Throughout the remainder of description, the terms "image database" and "collection of images" will be used interchangeably.

Let $(C_n)n=1 \ldots N$ be these characteristics and let $y_{1,n} \in \{0,1\}$ be the presence ($y_{1,n}=1$) or absence ($y_{1,n}=0$) label supplied by the experts for the image $I$ of the collection and the characteristic $c_n$. Let $f_n$ be the frequency of the characteristic $c_n$ in the database $B$ ($f_n = \Sigma_{I \in B} y_{I,n}$). The characteristics are sorted in descending order of frequency ($f_{n'} \leq f_n$ $\forall n' \geq n$). Throughout the remainder of the description, a frequent characteristic denotes a characteristic for which the frequency in the considered collection of images is greater than or equal to a given threshold frequency and a rare characteristic denotes a characteristic for which the frequency in the considered collection of images is less than said frequency threshold. As mentioned hereafter, this threshold optionally can be modified.

The database B is preferably divided into a learning database $B_A$ used for deep learning, a validation database $B_V$ and a test database $B_T$ that are mutually exclusive ($B_A \cap B_V = B_A \cap B_T = B_V \cap B_T = \emptyset$; $B_A \cup B_V \cup B_T = B$).

With reference to FIG. 1, the automatic image analysis method advantageously comprises a first step, reference sign 10, of preprocessing images of the database B. This step is specific to the type of images contained in the database B. For the fundus oculi images (such as those supplied by the OPHDIAT network), the images are re-dimensioned, for example. A square region of interest is defined, for example, around the field of vision of the camera, and is then reduced to a dimension of 299×299 pixels. A change of color space is then advantageously carried out. The method transitions from the RGB representation to the YCrCb representation, for example. The component Y, which represents the luminance, is normalized in order to remove the inter- and intra-image illumination differences. To this end, the background is estimated using large Gaussian filtering in the component Y, then the estimated background is removed from this component. The method then transitions back from the YCrCb representation to the RGB representation in order to obtain the preprocessed images.

Figure 2A:
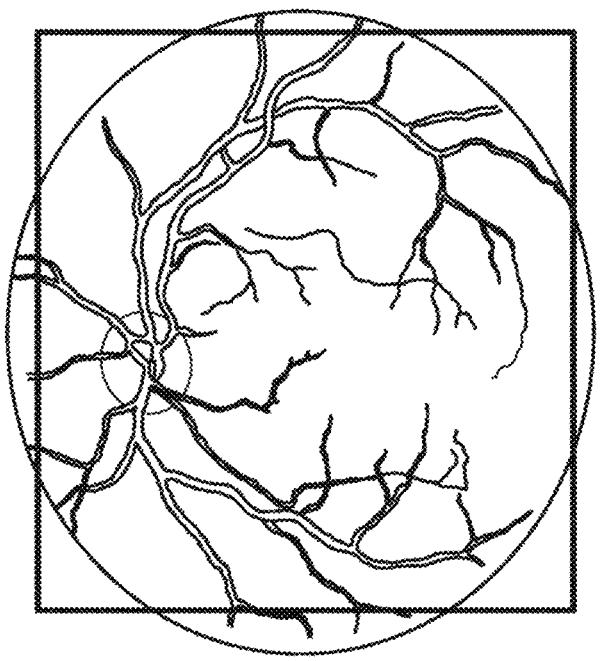
FIG. 2a shows an original image to be analyzed before preprocessing.
Figure 2B:
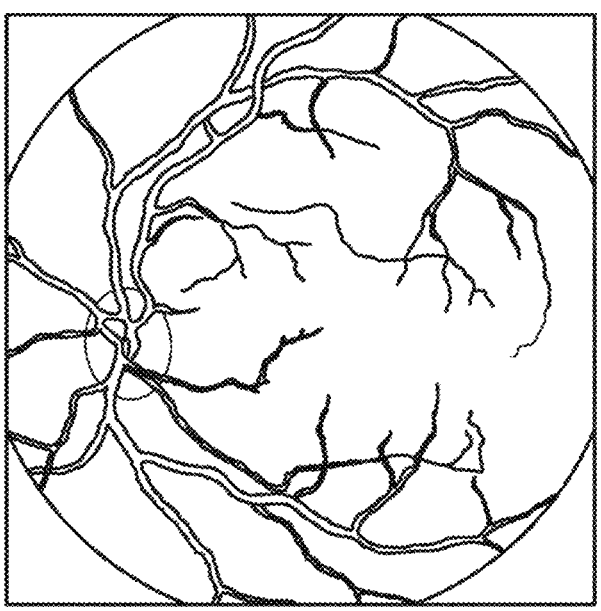
FIG. 2b shows said original image to be analyzed after preprocessing.
Figure 3A:
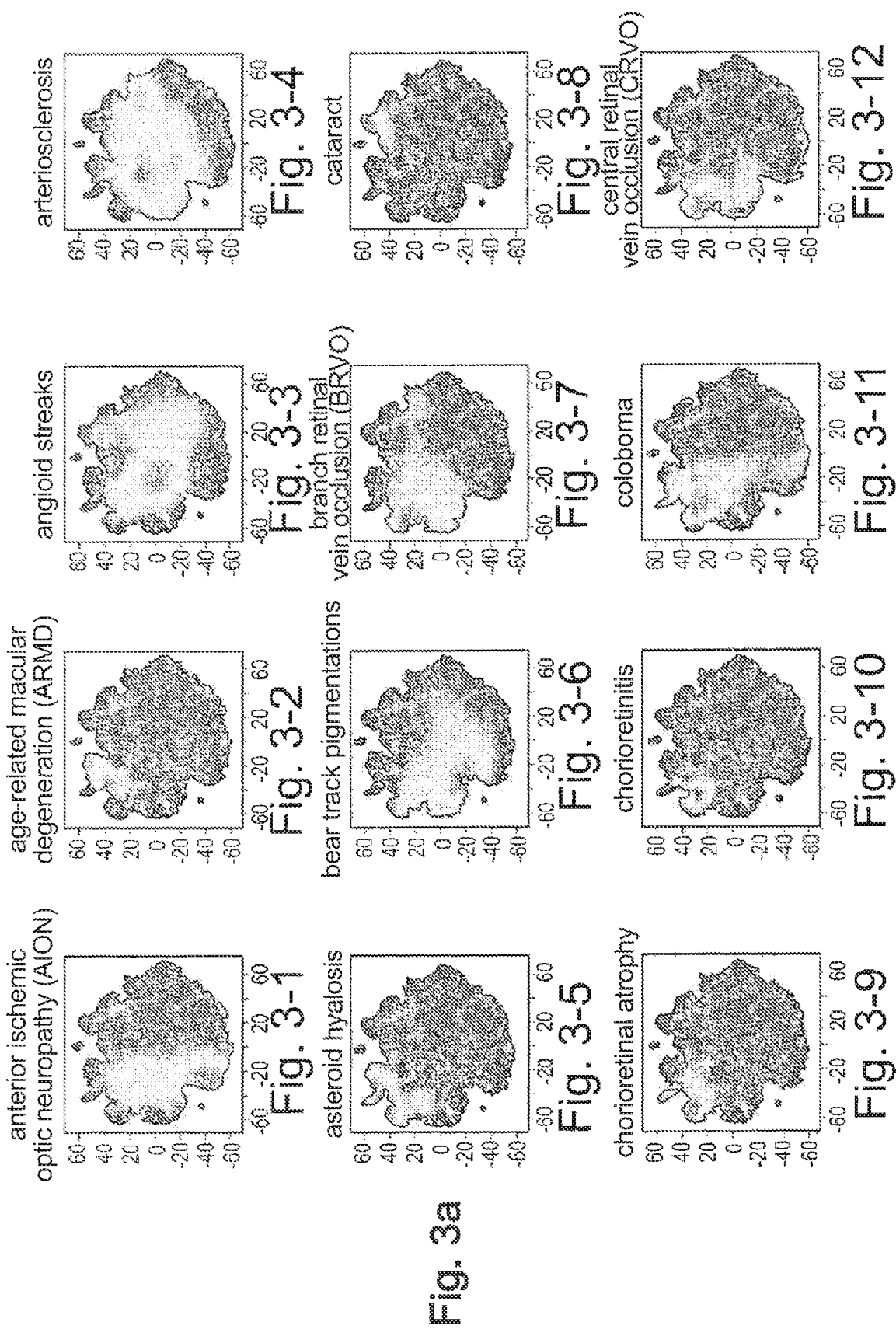
FIG. 3a shows presence probability density functions of 12 characteristics from among 41 characteristics that are specific to eye pathologies or that are visible in the eye.
Figure 3B:
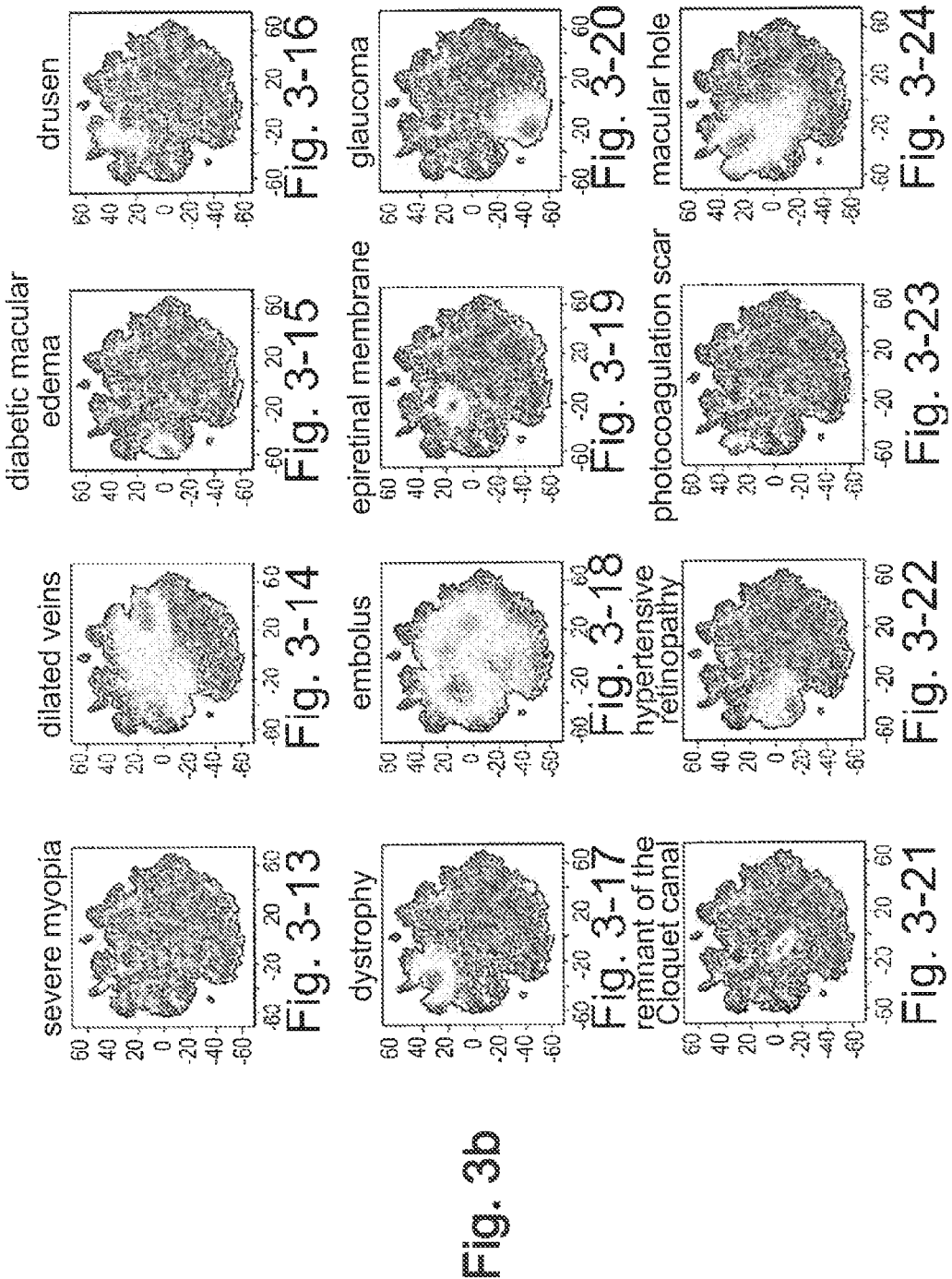
FIG. 3b shows presence probability density functions of 12 other characteristics from among the 41 characteristics that are specific to eye pathologies or that are visible in the eye.
Figure 3C:
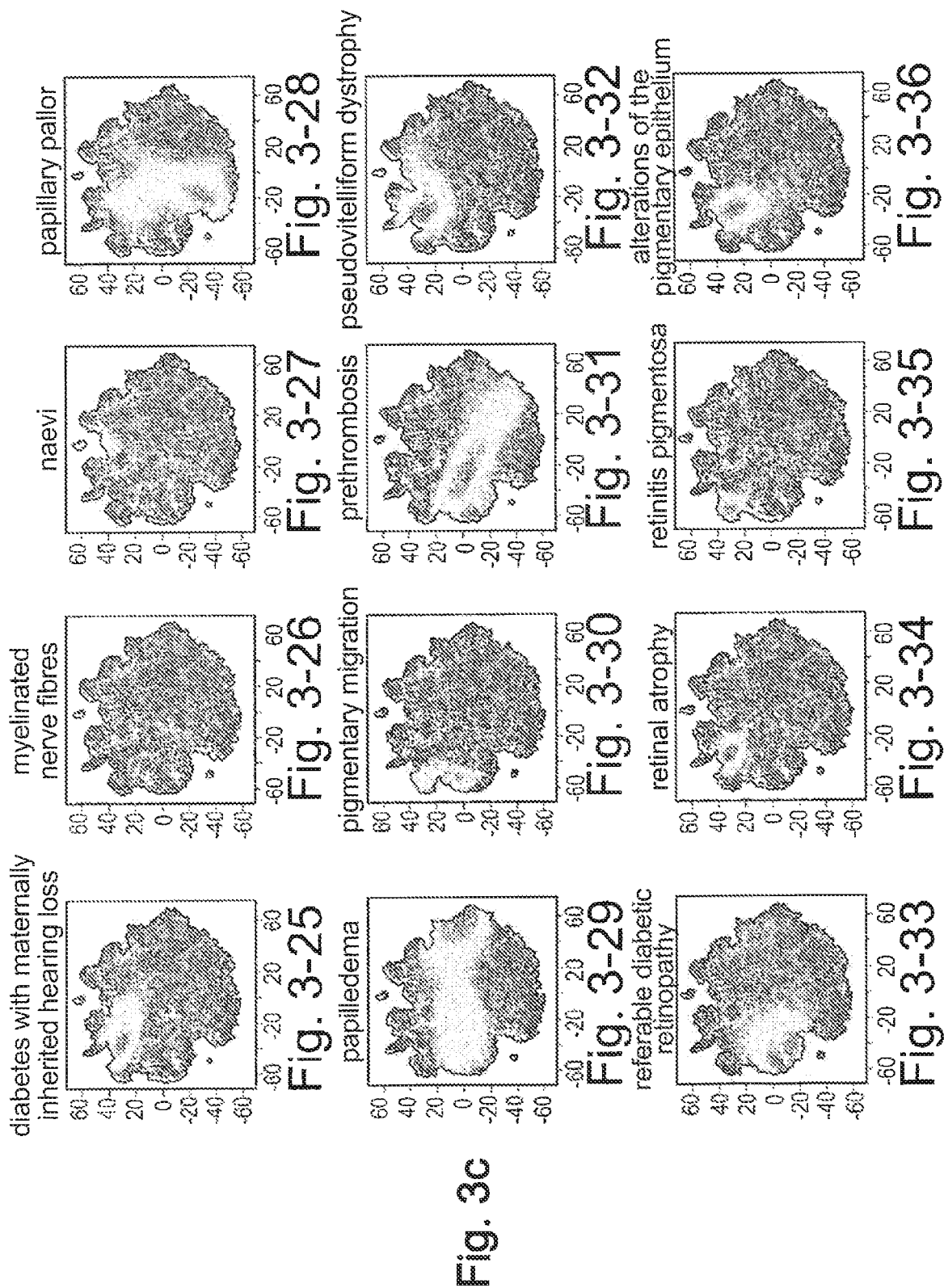
FIG. 3c shows presence probability density functions of 12 other characteristics from among the 41 characteristics that are specific to eye pathologies or that are visible in the eye.
Figure 3D:
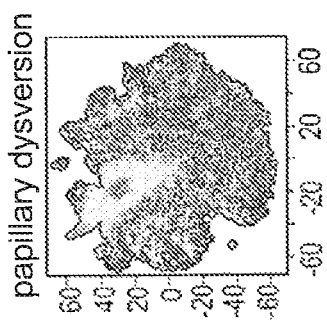
FIG. 3d shows presence probability density functions of the last 5 characteristics from among the 41 characteristics that are specific to eye pathologies or that are visible in the eye.
Figure 3D:
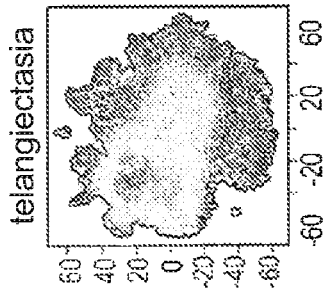
Figure 3D:
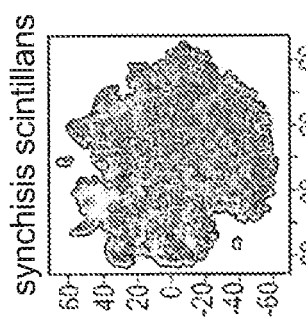
Figure 3D:
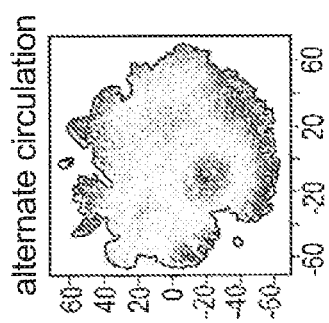
Figure 3D:
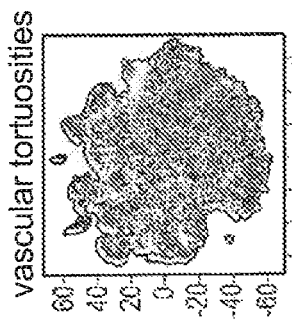

This preprocessing step 10 is illustrated in FIGS. 2A and 2B. These figures show fundus oculi images. FIG. 2A shows an original image and FIG. 2B shows the same image after preprocessing. The zone of interest of the original image is defined by a white square.

These preprocessed images are subsequently processed to determine a deep learning model intended to recognize frequent characteristics. This model is generated by a step 20 of supervised deep learning for recognizing at least one frequent characteristic. This model is formed by one or more convolutional neural networks (or CNNs). In this step, the one or more neural networks is/are trained by the preprocessed images comprising the frequent characteristics. Learning is said to be supervised learning since it is carried out on the basis of images annotated by an expert, with the annotation involving indicating whether or not the image in question comprises each of the N characteristics (frequent or rare).

According to a particular embodiment, a neural network is trained separately or jointly for each frequent characteristic during step 20.

According to a particular embodiment, the various neural networks are advantageously trained simultaneously, via a logistic regression, in order to maximize their complementarity.

The neural networks are trained to recognize the M most frequent characteristics from among the N characteristics listed in the database B. In the example of the database of the OPHDIAT telemedical network, M is determined so that the occurrence frequency $f_n$ of the M most frequent characteristics $(c_n) n=1 \ldots M$ is greater than 1,000 ($f_n \geq 1,000$ $\forall n \leq M$). In this example, M is then equal to 11 (M=11).

The model is defined, for example, as a multi-label classifier, trained to minimize the following cost function $\mathcal{L}$:

$$\begin{cases} \mathcal{L} = -\sum_{n \leq M} \sum_{I \in \mathcal{B}_A} y_{I,n} \log \sigma(x_{I,n}) + \\ \qquad\qquad (1 - y_{I,n}) \log(1 - \sigma(x_{I,n})) \\ \sigma(x) = \dfrac{1}{1 + e^{-x}} \end{cases} \quad \text{[Math 1]}$$

where:

$\chi_{I,n} \in \mathbb{R}$ is the output of the model for the image I and the characteristic $c_n$, $n \leq M$; and the image I is an image of the learning database $B_A$.

The output $X_{I,n}$ is transformed by logistic regression into a probability $P_{I,n}^M$ via the activation logistic function $\sigma$: $p_{I,n}^M = \sigma(\chi_{I,n}) \in [0,1]$. For the sake of simplification, this probability is denoted $P_{I,n}$ throughout the remainder of the description. As an alternative embodiment, the "softmax" activation function can be used instead of the function $\sigma$. The sigma function $\sigma$ nevertheless remains more beneficial since it allows images to be taken into account that jointly have several of the N characteristics, contrary to the "softmax" activation function, which considers that an image only has a single characteristic.

As previously indicated, the generated deep learning model is a set or a concatenation of trained convolutional neural networks (CNNs). Each CNN is advantageously selected from among the following known models:

Inception-v3, which is described in the document entitled "Rethinking the inception architecture for computer vision" by C. Szegedy, V, Vanhoucke, S. Ioffe, J. Shlens, Z. Wojna (Proc IEEE CVPR. Las Vegas, NV, USA; 2016:2818-2826, doi:10.1109/CVPR.2016.308);

Inception-v4, which is described in the document entitled "Inception-v4, Inception-ResNet and the impact of residual connections on learning" by C. Szegedy, S. Ioffe, V. Vanhoucke, A. Alemi (Proc AAAI. San Francisco, CA, USA; 2017:4278-4284);

VGG-16 and VGG-19, which are described in the document entitled "Very deep convolutional networks for large-scale image recognition" by K. Simonyan, A. Zisserman (Proc ICLR. San Diego, CA, USA; 2015);

ResNet-50, ResNet-101 and ResNet-152, which are described in the document entitled "Deep residual learning for image recognition" by K. He, X. Zhang, S. Ren, J. Sun (Proc CVPR. Las Vegas, NV, USA; 2016:770-778. doi: 10.1109/CVPR.2016.90);

NASNet-A, which is described in the document entitled "Learning transferable architectures for scalable image recognition" by B. Zoph, V. Vasudevan, J. Shlens, QV.Le (Proc IEEE CVPR. Salt Lake City, UT, USA; 2018).

These CNNs are advantageously pre-trained on the public ImageNet database (http://www.image-net.org/), then refined on the learning database $B_A$. The CNNs or pairs of CNNs maximizing the classification score on the validation database $B_V$ are used as models throughout the remainder of the method. The classification score is defined, for example, as the area under an ROC (Receiver-Opening Characteristic) curve that is well known to a person skilled in the art in the field of machine learning.

According to a particular embodiment, the CNNs used for the database of the OPHDIAT network are Inception-v3 and/or Inception-v4 networks and/or pairs of "Inception-v3+Inception-v4" networks.

The step 30 of constructing a parameter space will now be described. In a known manner, each CNN is arranged into processing layers, with each layer delivering several parameters as output. The first layer is applied to an input image and each succeeding layer is applied to the values of the output parameters of the preceding layer. Given that one or more CNNs is/are trained to recognize all the M most frequent characteristics, the penultimate layer of this CNN (or of these CNNs) and the other intermediate layers preceding the penultimate layer deliver very general high level data and in particular data of parameters allowing these M characteristics to be recognized. The parameters delivered by the outputs of this penultimate layer are used to define a parameter space, with each output parameter forming a dimension of the parameter space. The parameter space is constructed in a step 30 shown in FIG. 1.

As an alternative embodiment, the parameter space is defined on the basis of an intermediate layer of the CNN (or of the CNNs) other than the penultimate layer, for example, the antepenultimate layer.

Advantageously, the one or more intermediate layers used to define the parameter space is/are selected based on the maximization of the Patrick-Fischer distance between the presence probability density of each frequent or rare characteristic and of the absence probability density of said characteristic (these probability density functions are subsequently defined in the description). The maximization can be carried out by considering a characteristic individually or by considering several characteristics simultaneously.

The Patrick-Fischer distance is described in detail in the document entitled "Nonparametric feature selection" by Patrick E., Fischer F., IEEE Trans Inform Theory, 1969; 15(5):577-584. doi:10.1109/TIT.1969.1054354.

With the number of output parameters of a CNN (=number of outputs of the penultimate layer of the CNN) being high, for example, 2,049 for Inception-v3, 1,537 for Inception-v4 and 3,586 for the Inception-v3+Inception-v4 pair, a dimension reduction is advantageously applied to the initial parameter space $\varepsilon$ at the output of the penultimate layer of the CNN by using a projection on a reduced parameter space. Throughout the remainder of the description, P denotes the number of parameters of the initial parameter space, with this initial space being denoted $\varepsilon$, and $\gamma_I$ denotes the projection of an image I of the database B in the initial parameter space $\varepsilon$. This dimension reduction is implemented in step 30.

According to a particular embodiment, the dimension reduction is unsupervised but is controlled by the images of the validation database By and the dimension reduction algorithm is the t-SNE algorithm described in the document entitled "Visualizing high-dimensional data using t-SNE" by L. Van der Maaten, G. Hinton (Journal of Machine Learning Research 9 (2008) 2579-2605).

In this embodiment, the reduction occurs in two steps. A first reduction step is based on a principal component analysis (PCA) allowing the space c of dimension P to transition to a first reduced space $\varepsilon'$ of dimension P', with P'<P. P' is equal to 50, for example. $\pi_I$ denotes the projection of an image I in the space $\varepsilon'$. In a second reduction step, the t-SNE algorithm is applied to transition from the space $\varepsilon'$ to a second reduced space $\varepsilon''$ of dimension P", with P"<P'. P" is equal to 2, for example. $\tau_I$ denotes the projection of an image I in the space $\varepsilon''$. In this algorithm, the projection $\varepsilon' \to \varepsilon''$ is based on a search for nearest neighbors in the space $\varepsilon'$.

The t-SNE algorithm has very good properties: even though it is unsupervised, the space $\varepsilon''$ that it generates allows very good separation of the various characteristics $(c_n)_{n=1 \ldots M}$.

A presence probability density function $F_n$ is subsequently defined in the second reduced space $\varepsilon''$ for each characteristic $c_n$, $n \leq N$ in step 40. This presence probability density function is determined on the basis of the projections $\tau_I$, in the space $\varepsilon''$, of all the images (images with a rare characteristic and images with a frequent characteristic) of the validation database $B_V$. The labels or annotations $y_{I,n}$ are used as a binary weighting factor so as to only take into account images having the considered characteristic $c_n$. It is defined as follows, for example, based on the Parzen-Rosenblatt method with a multivariate Gaussian kernel K:

$$F_n(\tau) = \frac{1}{\sum_{I \in \mathcal{B}_V} y_{I,n}} \sum_{I \in \mathcal{B}_V} K\left(\frac{\tau - \tau_I}{h_n}\right) \qquad \text{[Math 2]}$$

The Parzen-Rosenblatt method is described in detail in the document entitled "On estimation of a probability density function and mode", Parzen E., Annals of Mathematical Statistics. 1962; 33(3):1065-1076. The window $h_n$, which governs the degree of smoothing of the function, is adjusted for each density function $F_n$. This window is selected, for example, in an unsupervised manner, according to the Scott criterion:

$$h_n = \left(\sum_{I \in \mathcal{B}_V} y_{I,n}\right)^{\frac{1}{P''+4}} \qquad \text{[Math 3]}$$

The Scott criterion is described in detail in the document entitled "Multivariate Density Estimation: Theory, Practice, and Visualization" by Scott D W., New York, Chichester: John Wiley & Sons; 1992.

In the same way, an absence probability density function $\overline{F_n}$ is defined for each characteristic $c_n$, $n \leq N$:

$$\overline{F_n}(\tau) = \frac{1}{\sum_{I \in \mathcal{B}_V} (1 - y_{I,n})} \sum_{I \in \mathcal{B}_V} K\left(\frac{\tau - \tau_I}{\overline{h_n}}\right), \qquad \text{[Math 4]}$$

$$\overline{h_n} = \left(\sum_{I \in \mathcal{B}_V} (1 - y_{I,n})\right)^{\frac{1}{P''+4}}$$

The probability density functions obtained for the N=41 characteristics of the data base of the OPHDIAT telemedical network for a given CNN (Inception-v3) are graphically shown in FIGS. 3-1 to 3-4I in a space reduced to P"=2 dimensions (X, Y). In these figures, density functions that are spatially extended (red, yellow, green and light blue portions) indicate poor separation of the "presence" and "absence" classes of the characteristic $c_n$, i.e. that the Patrick-Fischer distance is short (this distance is defined hereafter by the equation 6). The selection of the one or more considered intermediate layers for computing density functions thus influences the ability to separate the images in which a characteristic is present from those in which this same characteristic is absent.

The presence or the absence of at least one of the characteristics $c_n$ in a learning image I is subsequently defined on the basis of the two probability density functions $F_n$ and $\overline{F_n}$ (equations (3) and (4)), by computing the following probability $q_{I,n}^M$ (hereafter denoted $q_{I,n}$ for the sake of simplification):

$$q_{I,n} = \frac{F_n(\tau_I)}{F_n(\tau_I) + \overline{F_n}(\tau_I)} \quad \text{[Math 5]}$$

This presence probability is valid for all the characteristics, rare or frequent.

It should be noted that the projection ε'→ε" carried out by the t-SNE algorithm has two limitations:
this projection is not derivable; and
this projection is only defined for the examples available when it is constructed (i.e. for the examples of the validation database $B_V$), and does not allow new examples to be projected in this space.

However, these limitations do not apply to the projection from the space B (space for defining images of the database B) toward the space ε (output space of the CNNs) or from the space ε toward the space ε' (projection carried out by the PCA).

As previously indicated, the t-SNE algorithm is unsupervised. In order to improve dimension reduction, it is also possible to optimize the projection ε'→ε" in a supervised manner. To this end, the intention is to maximize the separation between the density functions $F_n$ and $\overline{F_n}$, for each characteristic $c_n$. In this advantageous embodiment, step 40 is looped back to step 20, as explained in detail hereafter.

As the projection ε'→ε" of the t-SNE algorithm is not derivable, a first step, called initialization step, then involves approximating the projection ε'→ε" using a derivable function. The selected derivable function is, for example, a multilayer perceptron, i.e. a non-convolutional neural network. The approximation is made by minimizing the mean square error between the output of t-SNE (the target) and that of the multilayer perceptron (the estimate). Once the approximation is complete, a step, called improvement step, starts. The cost function of the initialization (step 20) is replaced by $\mathcal{L}'$, the sum of the squares of the Patrick-Fischer distances between the density functions $F_n$ and $\overline{F_n}$, n=1 . . . N:

$$\mathcal{L}' = -\Sum_{n=1}^{N} \sum_{I \in \mathcal{B}_V} (F_n(\tau_I) - \overline{F_n}(\tau_I))^2$$

For the sake of efficiency, the terms $\tau_I$, $h_n$ and $\overline{h_n}$ of equations 2, 3 and 4 are considered to be constants during the minimization of $\mathcal{L}'$ and are reassessed at regular intervals. The new projection ε'→ε" then has an expression. The nearest neighbors method therefore is no longer required in this case.

The approach that is thus proposed can be extended to the optimization of the projection ε'→ε". There is then no need for the principal component analysis (PCA) in the dimension reduction chain. It also can be extended to the entire processing chain (projection B→ε"), with the cost function $\mathcal{L}'$ then being used to optimize the weights of the CNNs. However, the more the degrees of freedom are increased, the less the solution is adapted to rare characteristics.

In the previously described embodiments, the M characteristics considered to be frequent are defined in relation to a threshold, for example, a frequency threshold that is set to 1,000 (the collection of images comprises at least 1,000 images comprising this characteristic). With this selection of frequency, and thereby of the value M, being arbitrary, according to an alternative embodiment, varying the number M of frequent characteristics is proposed, M≤N. For example, for the database of the OPHDIAT network, M is varied from 11 to 41 (=N).

In order to limit the number of computations, M can be varied in steps of 6: M then assumes the following values M∈{11, 17, 23, 29, 35, 41}. For each value of M and each characteristic $c_n$, a classification score $S_{q,n}^M$ is assessed on the validation database based on the probabilities $q_{I,n}^M$ defined by the equation (5). For the frequent characteristics $c_n$, i.e. such that n≤M, a second classification score $S_{p,n}^M$ is obtained based on the probabilities $P_{I,n}^M = \sigma(x_{I,n}) \in [0,1]$ of the learning model. For each characteristic $c_n$, the maximizing model $S_{r,n}^M$, r∈{r,q} is retained.

On completion of this learning phase, a deep learning model is thus obtained for recognizing the frequent characteristics in any new image to be analyzed, as well as probability functions for each characteristic for recognizing the rare characteristics and optionally the frequent characteristics.

The analysis phase to be followed involves detecting the presence or the absence of a rare or frequent characteristic in any new image I to be analyzed.

During this analysis phase, the presence of a frequent characteristic in the new image I is detected, in step 60, by the deep learning model originating from step 20, corresponding to the trained neural network. As an alternative, the presence of a frequent characteristic in the new image I is detected, in step 60, by projecting the image I in the reduced parameter space ε" constructed in step 30 during learning and by applying the presence probability function associated with this characteristic and defined in step 40 to the projected image. The presence of a rare characteristic in the new image I is detected, in step 50, by projecting the image I in the reduced parameter space ε" defined during learning and applying the presence probability function associated with this characteristic to the projected image. The new image I is advantageously preprocessed (as in step 10) before steps 50 and 60 are implemented.

As the expression of the projection ε'→ε" of the t-SNE algorithm is only known for the examples used during learning (previously mentioned limitation), the following procedure is proposed for determining the probability that a new image I contains the characteristic $c_n$:
  the image I is preprocessed (as in step 10);
  the preprocessed image is subsequently submitted to the CNN (or to the CNNs) and the outputs γI of the penultimate layer are computed;
  the projection ε→ε' originating from the PCA is applied to obtain πI;
  the method of the k nearest neighbors (k is equal to 3, for example) is then used to estimate $q_{I,n}$ by regression; this search for the k nearest neighbors occurs in the reduced space ε'; the reference database is the database $B_V$ with all the pairs $((\tau I_J, q_{I,n}))_{I \in B_V}$, with each pair thus being formed by a reference image projected in the space ε' and by an associated probability value $q_{J,n}$, where the values $q_{J,n}$ are exactly determined by the equation (5);
  if n≤M, the probability $p_{I,n}$ also can be estimated; therefore, two probabilities are available for the frequent characteristics: $p_{I,n}$ and $q_{I,n}$.

A classification score then can be obtained, for the image I, representing a probability for each of the rare or frequent characteristics. The higher this score, the greater the probability that the image I comprises the characteristic.

Advantageously, the automatic image analysis method is completed by a step of determining pixels responsible for recognizing the rare or frequent characteristic $c_n$ in the analyzed image. This allows the pixels of the image responsible for the characteristic $c_n$ to be viewed or mapped. This step uses reference sign 70 in FIG. 1.

This step is carried out by gradient backpropagation computed through each of the convolutional neural networks and any projections involved in the construction of the parameter space.

For this step, the presence probability functions of each characteristic $c_n$ in a previously defined image I are used: $p_{I,n}^M$ for the frequent characteristics and/or $q_{I,n}^M$ for the rare or frequent characteristics.

In the case whereby the recognition is based on $P_{I,n}^M$, determining responsible pixels by gradient backpropagation is described, for example, in the document entitled "Deep image mining for diabetic retinopathy screening" by G. Quellec, K. Charrière, Y. Boudi, B. Cochener, M. Lamard. Medical Image Anal. 2017; 39: 178-193; oi: 10.1016/j.media.2017.04.012. In the case whereby the recognition is based on $q_{I,n}^M$, two specific cases arise for determining the importance of a pixel $I_{xy}$ for classifying an image I of size W×H×3. Hereafter, the characteristic $c_n$ is denoted c for ease of notation.

In a first specific case, the entire processing chain is derivable, which is the case when the t-SNE algorithm is replaced by a derivable function such as a multilayer perceptron.

In a second specific case, at least one step of the processing chain is non-derivable (which is the case with the t-SNE algorithm).

In the first specific case, the importance $\xi_{xyc}$ of each pixel $I_{xy}$, for the characteristic c, is determined as follows:

$$\xi_{xyc} = \frac{\partial G(m \circ I, c)}{\partial m_{xy}} \qquad [\text{Math 7}]$$

where G is a derivable computation graph representing the entire processing chain, m denotes a matrix of the size W×H filled with 1 and ∘ denotes the Hadamard matrix product. The criterion $\xi_{xyc}$ highlights the pixels of the image that explain the probability density for the characteristic c at the point I. This solution is based on the gradient backpropagation computed on the entire processing chain, i.e. between the space for defining images of the database and the presence probabilities space [0; 1].

In the second specific case, the importance $\xi_{xy}$ of each pixel $I_{xy}$ is determined as follows:

$$\zeta_{xy} = -\frac{1}{KP}\sum_{\lambda=1}^{\Lambda} \frac{\partial}{\partial m_{xy}} \left( \frac{\|\gamma_{m \circ I} - \gamma_{V_\lambda}\|}{\left\|\gamma_{m \circ I} - 1/D \sum_{d=1}^{D} \gamma_{W_d}\right\|} \right) \times \\ \text{sgn}\left(\sum_{z=1}^{3} I_{xyz}\right) \left\|\gamma_I - 1/D \sum_{d=1}^{D} \gamma_{W_d}\right\|^2 \qquad [\text{Math 8}]$$

where $(W_d)d=1 \ldots D$ are the D images of the database, $(V_\lambda)\lambda=1 \ldots \Lambda$ are the $\Lambda$ ($\Lambda=10$) nearest neighbors of I in the parameter space $\varepsilon'$ (defined by the PCA, for a quick search), $\|\cdot\|$ is the norm L2 and sign (•) is the "sign" function. The criterion $\xi_{xy}$, which allows the non-derivability to be circumvented, highlights the pixels of the image that are nearer to its neighbors than the other images. This case also uses the gradient backpropagation computed on the entire processing chain.

The important pixels responsible for detecting the rare or frequent characteristic thus can be displayed.

Figure 4:
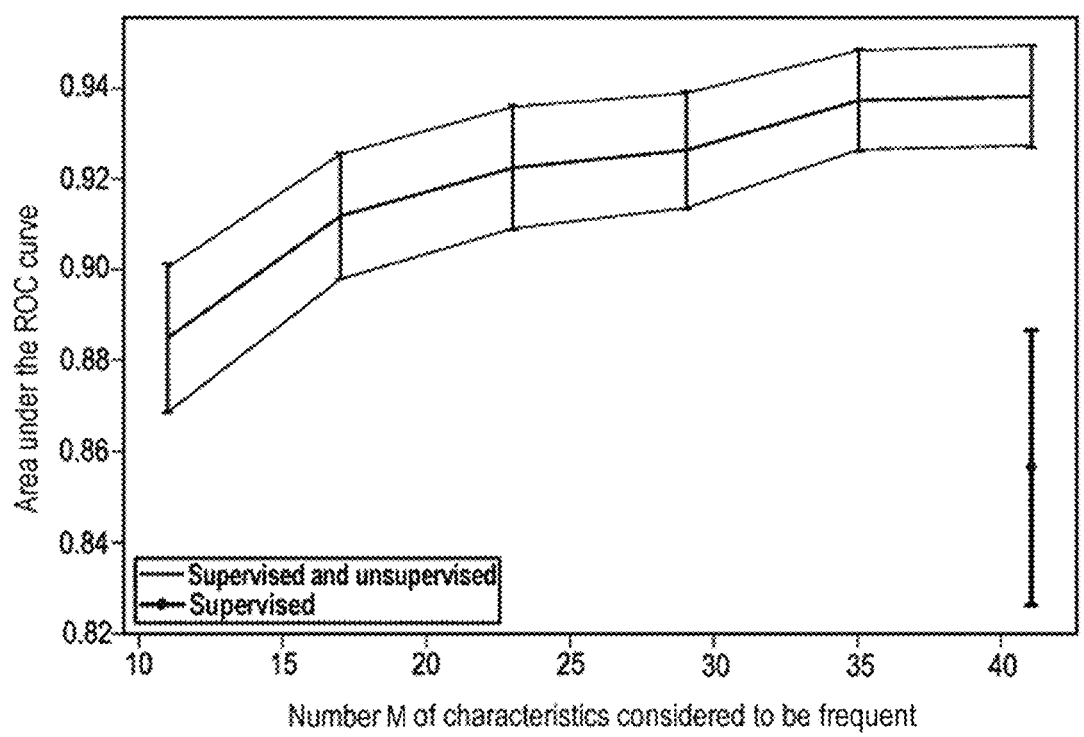
FIG. 4 shows curves illustrating the average performance for detecting frequent or rare characteristics of the automatic image analysis method.

The results obtained on the database of the OPHDIAT network, based on $S_{p,n}^M$ or on $S_{r,n}^M$, $r \in \{p, q\}$, are shown in FIG. 4. With the results using $S_{p,n}^M$, the scores originating from the supervised learning, and $S_{q,n}^M$, those from the non-supervised learning, are in green. Those only using $S_{p,n}^M$ are in red (supervised learning only). Each color curve represents the area under the ROC (Receiver Operating Characteristic) curve as a function of the number M of characteristics considered to be frequent. M varies from 11 to 41 in steps of 6 for the green curve. These two curves represent the average performance for detecting characteristics as a function of the number M of characteristics considered to be frequent. In both cases, CNNs are trained for each value of M'∈{11, 17, . . . , M} and the best CNN is selected for each characteristic. In the "supervised only" case, the presence probability can only be computed for the frequent characteristics. It is therefore necessary to wait for M=41 in order for at least one CNN to be available per characteristic, hence a single point. The error bars represent the standard deviation.

Figure 5:
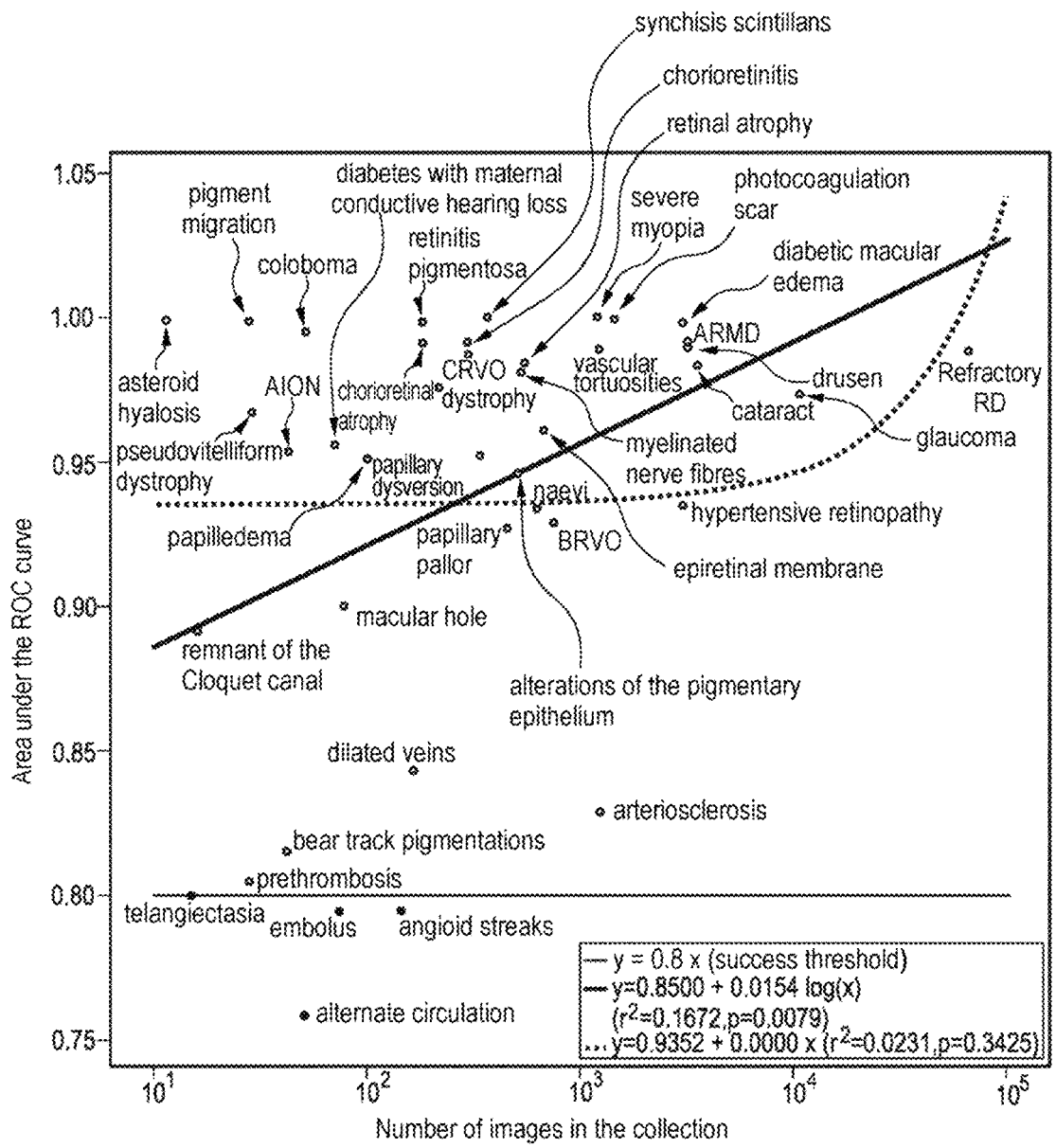
FIG. 5 shows curves illustrating the average performance for detecting frequent or rare characteristics of the automatic image analysis method as a function of the frequency in the collection of images used for learning.

FIG. 5 illustrates the performance of the automatic image analysis method for recognizing a rare or frequent characteristic (more specifically the pathologies of the database of the OPHDIAT network) as a function of its frequency $f_n$. An area under the ROC curve that is less than 0.8 is considered to be a failure. This figure shows that the correlation between the area under the ROC curve and the frequency is very weak. It can be seen that rare pathologies, such as asteroid hyalosis, can be detected equally as well as more frequent pathologies such as ARMD. Some rare pathologies, such as telangiectasia, remain difficult to detect.

The automatic image analysis method can be applied to the detection of any type of rare characteristics or events on the basis of images.

To summarize, the method comprises a learning phase and an analysis phase.

The learning phase comprises:
  a step of supervised deep learning of at least one convolutional neural network on the basis of a collection of predetermined images for generating a learning model configured to recognize at least one frequent characteristic in an image to be analyzed, said collection of predetermined images comprising images having said at least one frequent characteristic and images having said at least one rare characteristic;
  a step of constructing a parameter space of dimension n, with n≥2, each parameter originating from at least one intermediate layer of said at least one trained convolutional neural network and each parameter representing a dimension of said parameter space;
  a step of determining a presence probability function in said parameter space for said at least one rare characteristic on the basis of a projection, in said parameter space, of said images of the collection of images having said at least one rare characteristic.

The analysis phase comprises, for an image to be analyzed, a step of recognizing said at least one rare characteristic in said image to be analyzed on the basis of the presence probability function determined for said at least one rare characteristic.

According to at least one example embodiment, the method further comprises, during the learning phase, a step of determining a presence probability function in said parameter space for said at least one frequent characteristic and, during the analysis phase, a step of recognizing said at least one frequent characteristic in said image to be analyzed on the basis of said learning model or of the presence probability function determined for said at least one frequent characteristic.

According to at least one example embodiment, the method further comprises, during the learning phase, a step of determining a presence probability function in said parameter space for said at least one frequent characteristic and in that the supervised deep learning step of said at least one convolutional neural network is supervised by said presence probability function of said at least one frequent characteristic.

According to at least one example embodiment, the method further comprises, during the learning phase, a step of preprocessing images of the collection of images for improving the learning of said at least one convolutional neural network.

According to at least one example embodiment, during the supervised deep learning step, a plurality of convolutional neural networks is trained separately or jointly, with each of said convolutional neural networks being trained to recognize said at least one frequent characteristic.

According to at least one example embodiment, the convolutional neural networks are trained simultaneously, via a logistic regression, in order to maximize their complementarity.

According to at least one example embodiment, during the step of constructing said parameter space on the basis of data originating from at least one intermediate layer of said at least one convolutional neural network, said at least one intermediate layer is selected from among the penultimate layers of said at least one convolutional neural network.

According to at least one example embodiment, said penultimate layers of said at least one convolutional network are selected based on the maximization of the Patrick-Fischer distance between the presence probability density of each rare or frequent characteristic and the absence probability density of said characteristic.

According to at least one example embodiment, the step of constructing the parameter space comprises a step of reducing the dimension of the parameter space.

According to at least one example embodiment, the dimension of the parameter space after reduction is equal to 2 or 3.

According to at least one example embodiment, the step of reducing the dimension of the parameter space is based on the t-SNE algorithm.

According to at least one embodiment, the method further comprises, for at least one rare or frequent characteristic recognized in an image, called current image, a step of determining pixels responsible for recognizing said rare or frequent characteristic, in said current image.

According to at least one embodiment, determining pixels responsible for recognizing said rare or frequent characteristic, in said current image, is obtained by gradient back-propagation through each of the convolutional neural networks involved in the construction of the parameter space.

According to embodiments, all or some of the steps of an analysis method described in this document are implemented by software or by a computer program.

The functions described in this document thus can be implemented by software (for example, via software on one or more processors, for execution on a general purpose computer (for example, via execution by one or more processors) in order to implement a special purpose computer or similar) and/or can be implemented in hardware (for example, using a general purpose computer, one or more specific integrated circuits (ASIC) and/or any other equivalent hardware).

The present description thus relates to software or a computer program configured to be executed by an analysis device (for example, a computer device or computer), by means of one or more data processors, with this software/program comprising instructions for causing this analysis device to execute all or some of the steps of the analysis method described in this document. These instructions are intended to be stored in a memory of an analysis device, loaded then executed by one or more processors of this analysis device, so as to cause this analysis device to execute the relevant method.

This software/program can be coded using any programming language and can be in the form of source code, object code, or of intermediate code between source code and object code, as in a partially compiled form, or in any other desirable form.

The analysis device can be implemented by one or more physically separate machines. The analysis device can assume the overall architecture of a computer, including constituent elements of such an architecture: data memory(ies), processor(s), communication bus, hardware interface(s) for connecting this analysis device to a network or another item of equipment, user interface(s), etc.

In one embodiment, all or some of the steps of the method described in this document are implemented by an analysis device provided with means for implementing these steps of the analysis method.

These means can comprise software means (for example, instructions of one or more components of a program) and/or hardware means (for example, data memory(ies), processor(s), communication bus, hardware interface(s), etc.).

Means implementing a function or a set of functions also can correspond, in this document, to a software component, a hardware component or even to a set of hardware and/or software components configured to implement the function or the set of functions, as described below for the relevant means.

The present description also relates to a data processor-readable storage medium comprising instructions of a program as mentioned above.

The storage medium can be any hardware means, entity or device configured to store the instructions of a program as mentioned above. Usable program storage media include ROM or RAM, magnetic storage media, such as magnetic disks and magnetic strips, hard disks or optically readable digital data storage media, etc., or any combination of these media.

In some cases, the computer-readable storage medium is not transitory. In other cases, the storage medium can be a transitory medium (for example, a carrier wave) for transmitting a signal (electromagnetic, electric, radio or optical signal) carrying program instructions. This signal can be routed via a suitable wired or wireless transmission means: electrical or optical cable, radio or infrared link, or by other means.

One embodiment also relates to a computer program product comprising a computer-readable storage medium, which stores program instructions, with the program instructions being configured to cause the analysis device to implement all or some of the steps of an analysis method described herein when the program instructions are executed by one or more processors and/or one or more programmable hardware components.

It will be understood that various modifications and/or improvements that are obvious to a person skilled in the art can be made to the various embodiments of the automatic image analysis method without departing from the scope defined by the appended claims.

The invention claimed is:

1. An automatic image analysis method, said method comprising a learning phase and an analysis phase, said method comprising:
during said learning phase:
a step of supervised deep learning of at least one convolutional neural network on the basis of a collection of images associated with annotations for generating at least one trained convolutional neural network, arranged in layers and forming a learning model configured to recognize at least one frequent characteristic in an image to be analyzed, said collection of images comprising images having said at least one frequent characteristic and images having at least one rare characteristic, a frequent characteristic corresponding to a characteristic presenting an appearance frequency on the collection of images which is equal or greater than a frequency threshold; a rare characteristic corresponding to a characteristic presenting an appearance frequency on the collection of images which is lower than a frequency threshold;
an annotation indicating whether a rare or frequent characteristic is present in an image of the collection of images;
a step of constructing a parameter space of dimension n, with n ≥2, each parameter originating from at least one intermediate layer of said at least one trained convolutional neural network and each parameter representing a dimension of said parameter space;
a step of determining a presence probability function in said parameter space for at least one rare characteristic on the basis of a projection, in said parameter space, of said images of the collection of images and annotations relating to said at least one rare characteristic;
during said analysis phase:
for an image to be analyzed, a step of recognizing said at least one rare characteristic in said image to be analyzed on the basis of the presence probability function determined for said at least one rare characteristic.

2. The analysis method as claimed in claim 1, further comprising, during the learning phase, a step of determining a presence probability function in said parameter space for said at least one frequent characteristic on the basis of a projection, in said parameter space, of said images of the collection of images and annotations relating to said at least one frequent characteristic.

3. The analysis method as claimed in claim 2, wherein the supervised deep learning step of said at least one convolutional neural network is supervised by said presence probability function of said at least one frequent characteristic.

4. The analysis method as claimed in claim 1, wherein, during the supervised deep learning step, a plurality of convolutional neural networks is trained separately or jointly, with each of said convolutional neural networks being trained to recognize said at least one frequent characteristic.

5. The analysis method as claimed in claim 1, wherein said parameter space is constructed on the basis of values of output parameters originating from at least one intermediate layer of said at least one convolutional neural network, said at least one intermediate layer being selected from among the penultimate layers of said at least one convolutional neural network.

6. The analysis method as claimed in claim 1, comprising a step of determining an absence probability function in said parameter space for said at least one rare characteristic on the basis of a projection, in said parameter space, of said images of the collection of images and annotations relating to said at least one rare characteristic,
said at least one intermediate layer being selected based on the maximization, for at least one considered rare characteristic, of the Patrick-Fischer distance between the presence probability function of said at least one considered rare characteristic and the absence probability function of said at least one considered rare characteristic.

7. The analysis method as claimed in claim 1, wherein the parameter space is a reduced parameter space and the step of constructing the reduced parameter space comprises a step of reducing the dimension of an initial parameter space at the output of said at least one intermediate layer of said at least one trained convolutional neural network.

8. The analysis method as claimed in claim 7, wherein said step of reducing the dimension of the initial parameter space is based on a principal component analysis algorithm and/or on a t-SNE algorithm.

9. The analysis method as claimed in claim 1, further comprising, for at least one rare characteristic, a step of determining, in the image to be analyzed, pixels responsible for recognizing said considered rare characteristic.

10. The analysis method as claimed in claim 8, the recognition step comprising:
constructing a second reduced parameter space by reducing the parameter space at the output of said at least one intermediate layer of said at least one trained convolutional neural network;
projecting, in the second parameter space, the image to be analyzed in order to obtain a projected image;
obtaining reference projected images in the second parameter space by projecting reference images of the collection of images; and
estimating a probability that the image to be analyzed contains the rare characteristic, said probability being computed by regression on the basis of presence probabilities of the rare characteristic determined for the reference images for which the reference projected images are the nearest neighbors of the projected image.

11. The analysis method as claimed in claim 10, wherein the second reduced parameter space is constructed by means of a principal component analysis applied to the parameter space at the output of said at least one intermediate layer and wherein the projection of an image in the second reduced parameter space is obtained by applying said at least one trained convolutional network to the considered image in order to obtain an output, then applying a projection function originating from the principal component analysis to this output.

12. The analysis method as claimed in claim 10, wherein the presence probability of a rare characteristic in a reference image is obtained by projecting the reference image in the reduced parameter space constructed for the rare characteristic so as to obtain a reference projected image, then applying the presence probability function defined in the reduced parameter space to the reference projected image.

13. An analysis device configured to implement the steps of the analysis method as claimed in claim 1.

* * * * *